United States Patent Office 3,671,246
Patented June 20, 1972

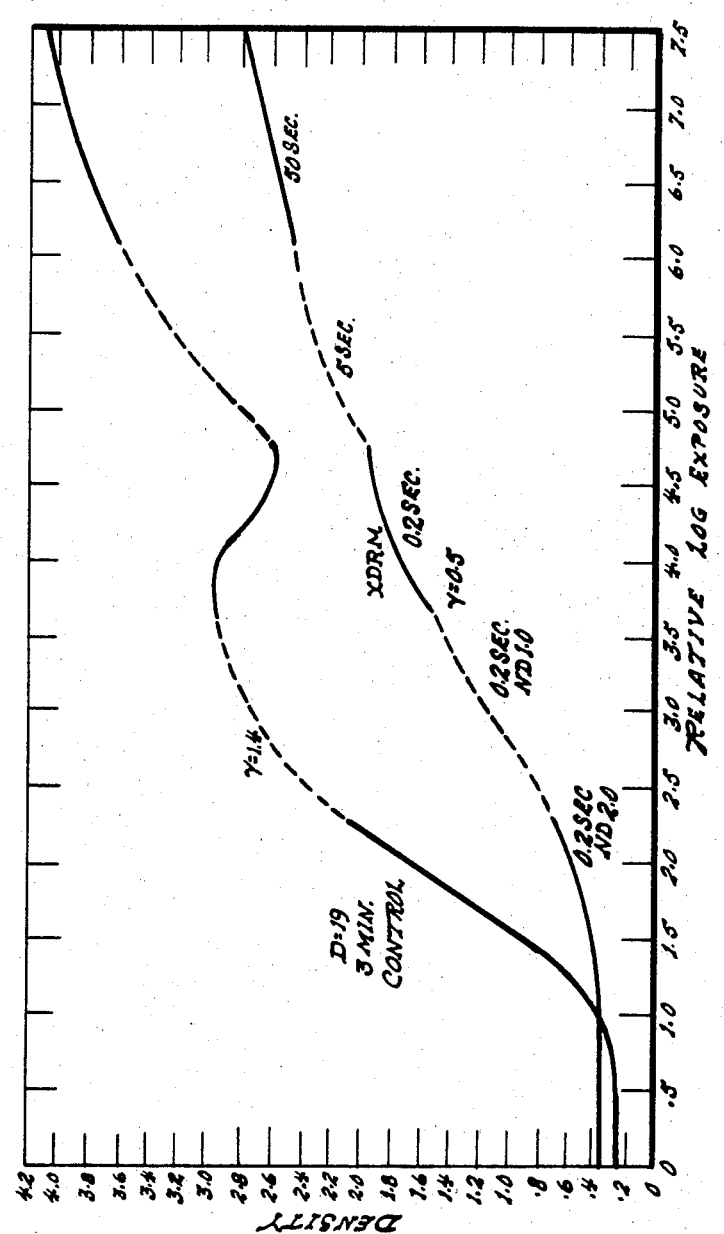

3,671,246
EXTENDED DYNAMIC RANGE PHOTOGRAPHIC PROCESSING
Leo D. Corben, Swampscott, William T. Kammerer, Towsend, and Allan Shepp, Lexington, Mass., assignors to the United States of America as represented by the Secretary of the Air Force
Filed Oct. 22, 1968, Ser. No. 769,761
Int. Cl. G03c 5/24, 5/26, 5/30
U.S. Cl. 96—66                                     6 Claims

ABSTRACT OF THE DISCLOSURE

A method for extended dynamic range processing of photographic film in which the exposed film is weakly developed in a dilute solution of surface developer. The emulsion surface of the film is then bleached with a dilute solution of bleach for a short period of time and cleared with a salt solution. The emulsion is then developed with full strength photographic developer and stopped fixed, washed, and dried in the conventional manner to produce a negative having an extension of the exposure latitude of the film from 3 orders to about 6 orders.

BACKGROUND OF THE INVENTION

This invention relates to a method of photographic processing a negative for increasing the effective dynamic range of the film and more particularly the invention is concerned with providing a method whereby the extremes of subject intensity can be recorded at levels lower than the maximum density of the film.

Conventional processing of photographic emulsion yields characteristic curves that go from minimum density or fog level to maximum density over an exposure range of 2 to 3 powers of ten of exposure (log $E=2$ to 3). It is sometimes desirable that extreme variations of light intensity be recorded on a single photographic frame. For example, photography of a clear bulb projection lamp. The intensity of the lamp filament is about 100,000 foot candles. If the lamp is the only source of illumination in a room, then the intensity of the room background is about one to ten foot candles. If the scene is photographed so that on normal development the background of the room is developed to a low density, then the intensity of the filament will lie on a region that produces maximum density on the film. Therefore, normal processing of the film will show the filament and the areas around it as totally black. Furthermore, regions near the filament will be fogged out, an effect generally known as "flaring," "blooming" or "vignetting."

SUMMARY OF THE INVENTION

The photographic processing methods of the present invention increase the effective dynamic range of the photographic emulsion of the negative so that extremes of subject intensity can be recorded at density levels lower than the maximum density of the film. When this is done, as in the case of a photograph of a clear bulb projection lamp, details of the filament can be observed and the flaring effect is substantially eliminated.

In accordance with the present invention, the photographic emulsion is processed by development of the internal image after the surface image has been weakly developed and bleached away. By this method, the film can record information over a wide range of exposure conditions and can record wide variations of exposure intensity on a single exposure frame. A characteristic curve is obtained that shows a low gamma of about 0.5 that extends over an exposure range of about 6 orders of magnitude (log $E=6$) going from minimum to maximum density. This extension of exposure latitude by internal image development from the usual 3 orders to about 6 orders has not been obtainable by any previously known film processing methods.

Production of a characteristic curve covering 6 orders by development of the internal latent image enables one to record photographic information over 6 orders without reaching the films maximum density and so without losing high intensity information.

Accordingly, it is an object of the present invention to provide a novel method of developing the internal image in a photographic emulsion.

Another object of the invention is to provide an extended dynamic range method of photographic processing.

Still another object of the invention is to provide a novel method of photographic processing wherein the characteristic curve of the film shows a low gamma of 0.5 extending over an exposure range of 6 orders of magnitude.

A further object of the invention is to provide a method of photographic processing wherein wide variations of exposure intensity can be recorded on a single frame.

A still further object of the invention is to provide a novel photographic processing method characterized by a simple procedure which utilizes well known and easily obtainable photographic chemicals.

These and other objects, features and advantages will become more apparent after considering the description that follows taken in conjunction with that attached drawing and appended claims.

DESCRIPTION OF THE DRAWING

The drawing is a density log E plot comparing the characteristic curves for conventional developing process (D–19) with the novel processing method according to the invention (XDRM). Plus-X pan film was used in obtaining the data for the comparison curves shown.

PREFERRED EMBODIMENT OF THE INVENTION

Although the utilization of the present invention is directed toward its use for extended dynamic range photographic processing, it should be understood that equally effective use of the invention can be made for increasing the exposure latitude property of the film as well as increasing the ability to record a wide dynamic range of information on a single frame without the adverse effect of flaring out of the high intensity range.

The invention can, of course, be used under normal exposure and development conditions to enhance the information content of the photograph as well as in the above-described adverse conditions. However, the primary utility of the hereinafter described photographic process lies in its use under conditions where it is necessary to obtain a long low gamma characteristic curve. Thus, the invention is particularly useful where these last named conditions are required such as where extreme variations of light intensity are to be recorded on a single photographic frame.

The first step in the present process is to weakly develop a latent photographic image with a relatively weak solution of a surface developer.

The second step in the present method is to bleach the surface of the emulsion with what is known in the art as a surface bleach. This is a conventional bleach for photographic emulsions in a relatively weak solution and is applied for a short period of time.

These first two steps first build up then remove all of the surface sensitivity and suface silver associated with the emulsion. This reduces the overall maximum density of the film and prevents total fogging of the film by high intensity light.

In step three, the film is cleared with a salt solution such as sodium sulfiate. In step four, the emulsion is developed with a full strength conventional photographic developer. After development, the fifth step comprises the conventional stop bath, fixing, washing and drying of the film.

We have discovered that the internal latent image is less sensitive to variations in light intensity, and exhibits a greater response to broad changes in light intensities than does the surface latent image. Therefore, the sensitivity of the internal image can be affected over a range of 6 orders of light intensity in contrast to surface sensitivity that can be affected over only 2 or 3 orders of light intensity. When the surface bleached film is developed, there is sufficient solvent in the developer to reveal the internal latent image and so bring about its development.

The following examples will illustrate the novel process of the invention. In each of the examples the invention process is called "XDRM" and exposure sequences were made on Plus-X pan film manufactured by Eastman Kodak Co., Rochester, N.Y. The control sequences were processed for 3 minutes at 68 degrees F. in Eastman Kodak D-19 developer followed by normal fixation, washing and drying.

Example I

The "XDRM" processed sequences were processed as follows:

(1) The emulsion was developed in a diaminophenol hydrochloride solution for 15 seconds. This solution was composed of the following:

Diaminophenol hydrochloride _____grams__ 3.0
Sodium sulfite _____do____ 14.0
Potassium bromide _____do____ 0.7
Water _____cc___ 500.0

The above stock solution is then further diluted in the ratio of 1 cc. to 100 cc. of water.

(2) The emulsion was then bleached for 45 seconds in a solution having the following composition:

Potassium dichromate _____grams__ 28
Sulphuric acid _____milliliters__ 4
Silver nitrate _____grams__ 2
Water _____liters__ 2

(3) The emulsion was cleared in a sodium sulfite solution composed of 20 grams of sodium sulfite per 100 cc. of water, for 30 seconds.

(4) Development was then carried on in a full strength solution of D-19 developer (manufactured by Eastman Kodak Co.) for 3 minutes.

(5) The emulsion was then processed through conventional steps of stop, fix, wash and dry.

In FIG. 1, the characteristic curves for both D-19 and XDRM processing are shown. It can be seen that for the XDRM processing, the gamma of about 0.5 remains constant without a reversal for over six orders of exposure, while the curve for D-19 (3 minutes at 68 degrees F.) reaches a first $D_{max}$ of 2.9 after three orders of exposures, then reverses and re-reverses in a density range too great to allow for photographic interpretation.

Example II

The process of Example I was repeated to illustrate the wide exposure latitude property of XDRM. Sixteen exposures of an outdoor scene were made on 35 mm. film, all at $f$–22. Exposure times were: $\frac{1}{500}$, $\frac{1}{250}$, $\frac{1}{100}$, $\frac{1}{50}$, $\frac{1}{25}$, $\frac{1}{5}$, $\frac{1}{2}$, 1, 2, 4, 8, 16, 32, 64, 128, and 256 seconds, that is, 16 frames covering exposure latitude of $1.3 \times 10^5$. At exposures of $\frac{1}{2}$ second and longer, the information was virtually fogged out in the D-19 processed film. The film processed by XDRM recorded all information on all frames. There was a slow increase of density from the shortest to the longest exposed frame, but an essentially constant relative density from one frame to the other.

Example III

The process of Example I was repeated to show the ability of XDRM to record a wide dynamic range of information on a single frame, without the adverse effect of flaring out of the high intensity image. The subject of the photographs was a room illuminated by a clear bulb projection lamp. The light intensity of the filament area of the lamp was approximately $10^5$ foot candles, while the light intensities of the darker background areas in the room were in the range of 1 foot candle. The scene was photographed over an 80-fold exposure range on 7 frames at $f$–22, with exposure times of $\frac{1}{8}$, $\frac{1}{2}$, 1, 2, 4, 8, and 16 seconds. The control strip processed in D-19 for 3 minutes at 68 degrees F., showed that the projection lamp filament area could not be seen clearly on any of the frames and, in fact, was nearly fogged out on most of the frames. Also, the background information near the base of the lamp was largely obscured by the flaring out of the filament area.

On the other film strip, the exposure sequence was processed by XDRM. On all of the frames of this film, the area of the filament could be measured and information throughout the room could be read especially in areas very near to the filament. The flame of the filament area was largely removed. Thus, a $10^5$-fold dynamic range was successfully recorded on all frames.

Although the invention has been described in the foregoing specification in terms of preferred embodiments thereof, it should be understood that variations and modifications can be effected without departing from the true spirit and scope of the appended claims.

Having thus described our invention, what we claim and desire to secure by Letters Patent of the United States is:

1. A process for extended dynamic range development of exposed panchromatic photographic film having a latent photographic image within the light sensitive emulsion thereof comprising the steps of weakly developing the surface of the exposed film emulsion in a diluted developing solution including the developing agent diaminophenol-hydrochloride for a period of 15 seconds, said developing agent being present in a concentration of 3 parts by weight in 50,000 parts by weight of water, bleaching the emulsion surface in a dilute solution of bleach until the weakly developed surface is removed, clearing the film in a salt solution, developing the remaining internal portion of the film emulsion with a full strength conventional developer until the latent image thereon is fully developed, and stopping, fixing, washing and drying the developed film thereby extending the exposure latitude of the film and producing a negative having a substantially increased effective dynamic range.

2. The process of claim 1 wherein said dilute solution of surface developer contains 3 grams of diaminophenol hydrochloride, 14 grams of sodium sulfite, 0.7 gram of potassium bromide and 500 cc. of water, said surface developer being further diluted by adding 100 parts water to each part developing solution.

3. The process of claim 1 wherein said bleaching solution contains 28 grams of potassium dichromate, 4 milliliters of sulphuric acid, 2 grams of silver nitrate and 2 liters of water.

4. The process of claim 1 wherein the clearing salt solution contains 20 grams of sodium sulfite in 100 cc. of water.

5. The process of claim 3 wherein the bleaching treatment by said dilute bleaching solution is carried out for 45 seconds.

6. The process of claim 4 wherein the clearing treatment in said clearing salt solution is carried out for 30 seconds.

References Cited

UNITED STATES PATENTS

| | | | |
|---|---|---|---|
| 2,984,567 | 5/1961 | Henn et al. | 96—66 |
| 3,178,282 | 4/1965 | Luckey et al. | 96—64 |
| 3,236,641 | 2/1966 | Nepela | 96—66 |
| 3,284,199 | 11/1966 | Muffet et al. | 96—66 |
| 1,814,788 | 7/1931 | Tartas | 96—59 |
| 2,178,896 | 11/1939 | Pifer | 96—59 |

J. TRAVIS BROWN, Primary Examiner

M. F. KELLEY, Assistant Examiner

U.S. Cl. X.R.

96—50, 63